United States Patent Office 2,989,979
Patented June 27, 1961

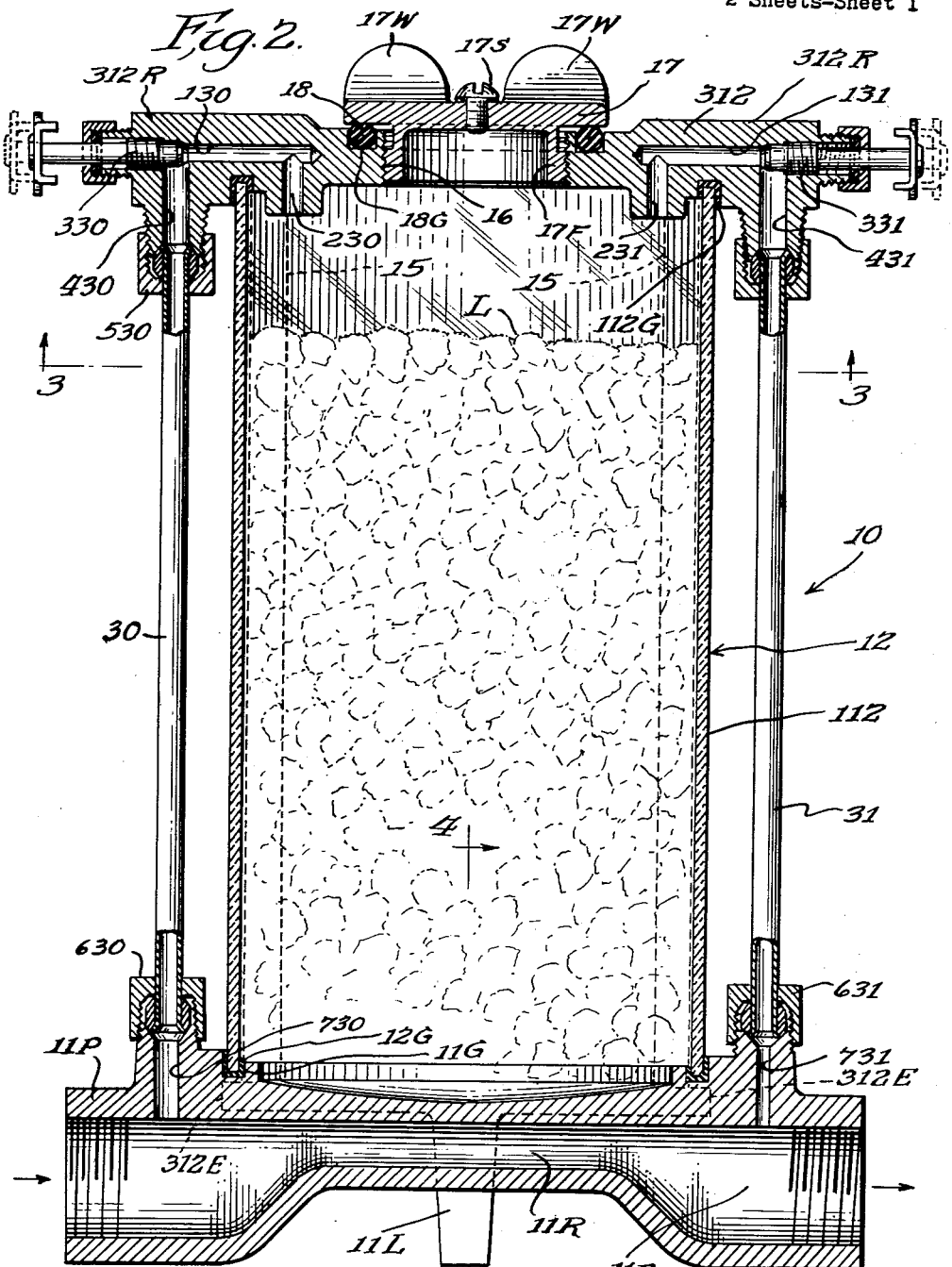

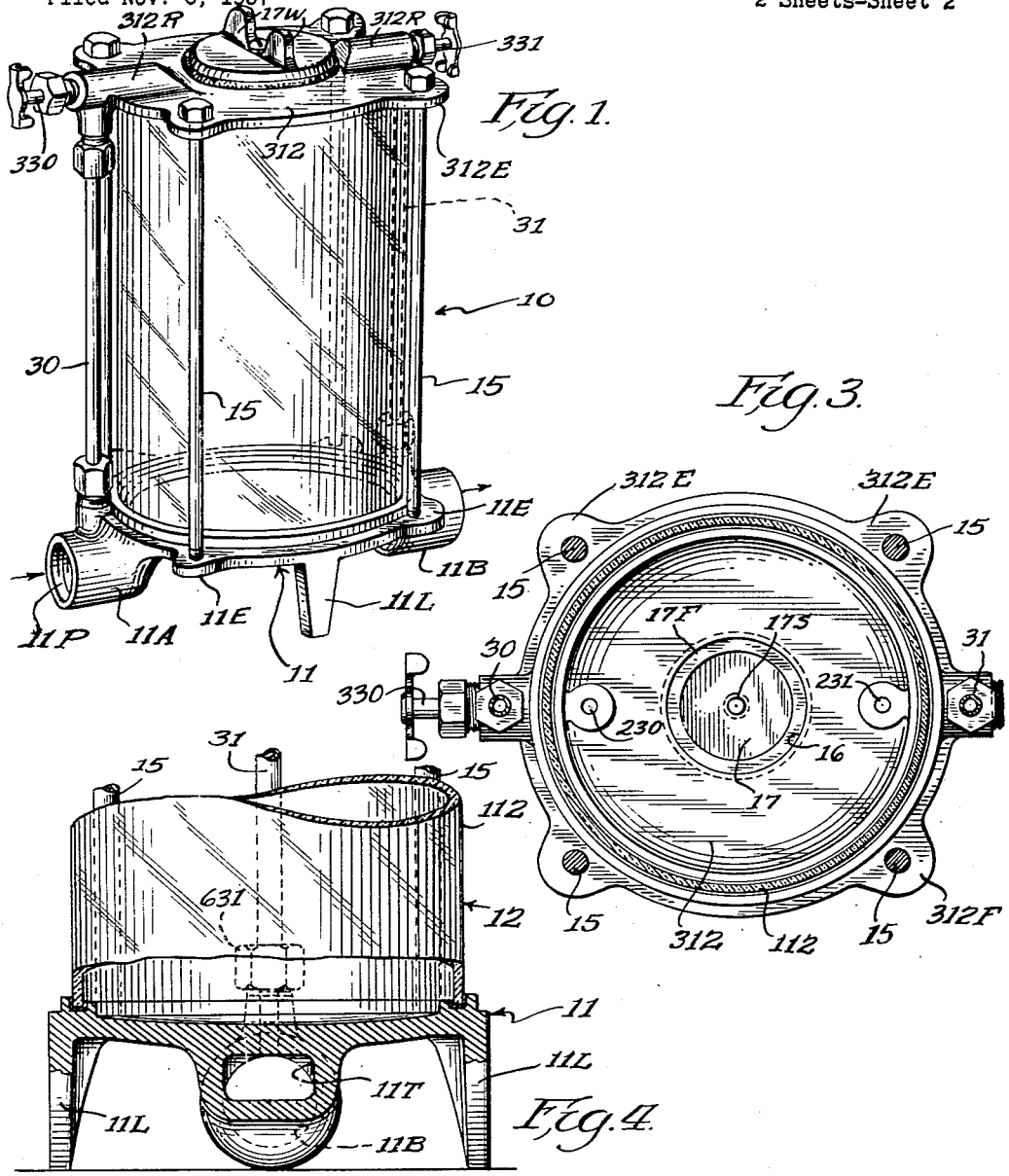

2,989,979
CHEMICAL FEEDERS
Wesley N. Karlson, 1015 S. James Place,
Park Ridge, Ill.
Filed Nov. 6, 1957, Ser. No. 694,849
3 Claims. (Cl. 137—268)

This application is a continuation-in-part of my copending application Serial No. 569,808, filed March 6, 1956.

This invention relates to chemical feeders and particularly to such devices for feeding a treating chemical into a water system in substantially constant proportion to the flow of water through such system.

There are many situations where it is desirable to treat water so as to improve certain of the characteristics thereof and it is known that through the feeding of phosphates into a water system, the water may be improved in many respects. Thus, treatment of this kind serves to hold iron and manganese in solution and serves in many instances to gradually remove deposits from the various parts of the system through which the treated water flows, and in addition it is found that there is some softening of the water as well as an improvement in the physical properties of the water.

Attempts have been made to attain a substantially proportional treatment of water with various kinds of phosphates through the use of a by-pass type of chemical feeder that has been known for many years as an "alum pot," but it is found that the use of such old and well-known feeders does not maintain the proportion or degree of treatment with a reasonable range. Moreover, it has been found with such "alum pot" type of feeders that it is necessary to utilize strainers at both the top and bottom of the chemical chamber, and further it has been found that the flow of water through the undissolved chemical in the chemical chamber of such a feeder introduces a wide variation in the degree of treatment that is attained.

In my aforesaid copending application I have disclosed a chemical feeder that simplifies and facilitates the feeding of water treating chemicals such as phosphates so as to minimize the variation in the degree of treatment that is attained, and in which the chemical feeder operation on the by-pass principle which eliminates the deposit of sediment from the feeder into the main line of the water system and which also eliminates the need for the use of screens in the inlet and outlet lines of the feeder.

The structure shown in such copending application comprises a by-pass type of feeder in which the water that flows through the by-pass and the chemical chamber flows along a path that is confined to those parts of the chemical chamber which are above the level of the undissolved chemical supply that is contained in the chamber so that the lumps or parts of solid chemical remain in a quiescent state and serve merely to provide a supply of saturated solution that is disposed in the path of movement of the by-pass water and hence the chemical treatment is effected merely by removal of portions of the saturated solution as the by-pass water moves through the upper portion of the chemical chamber.

In the by-pass feeder that I disclosed in my aforesaid copending application, a substantially uniform proportional flow of treating liquid may be attained, but it has been found in practice that the adjustment of the restriction and the adjustment of the effective area of the by-pass requires considerable skill and considerable time so as to coordinate the feeder adjustments with the pressure and flow rates that are encountered. It is therefore the primary object of the present invention to provide a by-pass type chemical feeder wherein the pressure differential necessary for feeding water through the by-pass of the unit is created in such a way that a substantially uniform proportional treating rate is attained within all of the usual variations of pressure and flow rate, and a related object is to provide such a feeder wherein no adjustment is needed in order to attain a feeding rate that is within the desired range and which will be maintained throughout the usual range of pressure and flow variations.

Other and further objects of the present invention will be apparent from the following description and claims, and are illustrated in the accompanying drawings, which by way of illustration, show a preferred embodiment of the present invention and the principles thereof, and what I now consider to be the best mode in which I have contemplated applying these principles. Other embodiments of the invention embodying the same or equivalent principles may be used and structural changes may be made as desired by those skilled in the art without departing from the invention.

In the drawings:

FIG. 1 is a perspective view illustrating a chemical feeder embodying the features of the invention;

FIG. 2 is an enlarged vertical sectional view showing the by-pass line and the means for creating the pressure differential;

FIG. 3 is a horizontal sectional view taken along the line 3—3 of FIG. 2; and

FIG. 4 is a fragmental vertical sectional view taken substantially along the line 4—4 of FIG. 2.

For purposes of disclosure, the invention is herein illustrated as embodied in a chemical feeder 10 that is adapted for association with a water system in such a manner as to create a pressure differential for inducing by-pass flow through the feeder in a substantially uniform proportion to the flow through the system. As herein shown, the chemical feeder 10 is illustrated as having a relatively heavy cast base 11 through which a horizontal passage 11P of varying cross section is extended from an inlet 11A through a restriction 11R of reduced area and to an outlet 11B so that the passage may be connected in a conventional pipe line of a water system wherein the flow of water is in the direction indicated by the arrows, or, in other words, from left to right through the passage 11P, as shown in FIG. 1.

The chemical feeder 10 embodies a chemical chamber that is afforded by a tank 12 at least one portion of the wall of which is preferably transparent so that the supply of chemical in the tank may be checked visually. Thus, in the present instance the tank or container 12 has a cylindrical vertical side wall 112 that is made from a relatively heavy transparent plastic, and the base 11 is annularly grooved at 11G to receive a gasket 12G and the lower edge of the wall 112, thus to provide a bottom wall for the tank.

The upper end of the side wall 112 is closed by a relatively heavy cast top wall 312 that has its lower face annularly grooved to receive a gasket 112G and the upper end of the side wall 112 and the base 11 and the top wall 312 are secured in a sealed relation therein by means of clamping bolts 15 that are extended along the outside of the wall 112 between extended ears 312E and 11E formed respectively on the top and the base. The enlarged end portions 11A and 11B of the passage cooperate with legs 11L to enable the feeder 10 to stand upright on a supporting surface. The top wall has a filling opening 16 therein, as shown in FIG. 4 of the drawings, and this filling opening 16 is internally screw threaded to receive the downwardly projecting screw threaded flange 17F of a cap or cover member 17. A resilient O ring 18 is disposed in an upwardly facing groove 18G surrounding the opening 16 so that a water-tight seal may be readily obtained about the filling opening 16. A pressure relief screw 17S is threaded through the cap 17 for purposes that will appear presently.

In the use of the present chemical feeder, a slowly soluble treating chemical, such as a phosphate material C that may be in lump form as shown in FIG. 2, is placed in the tank 12 preferably so that the tank is substantially full, as indicated at L in FIG. 2, and this supply is preferably in excess of the amount of chemical that will dissolve during a treatment period of between refillings of the tank 12. Thus, the tank may be made of such a size that about one-fourth of a complete tank full of chemical will dissolve in one month, so that at the end of the month the tank 12 may be recharged by supplying make-up chemical equivalent to about one-fourth of the original charge.

The chemical C serves, when the chamber 12 is full of water, to produce a saturated chemical solution, and under the present invention, provision is made so that during period of flow of water in the passage 11P, a proportional part of the water from the pipe line 11 will be by-passed and will flow through the upper portions of the tank 12 and will then be returned to the pipe line 11. In such operation the by-pass water does not, under the present invention, flow through the undissolved chemical supply in the tank, but in contrast, flows only through the top of the tank above the line L where it takes up, and dilutes to some extent, portions of the saturated chemical solution that is contained in the tank 12 above the undissolved chemical supply. Thus the flow coefficient of the by-pass system remains constant and at all times bears the same constant relation to the flow coefficient of the passage 11P.

Thus, in producing such by-pass flow, the chemical feeder has an inlet by-pass line 30 and an outlet by-pass line 31 that are connected to the passage 11P at points of different pressure so that this pressure differential produces the desired by-pass flow. The inlet line 30 and the outlet line 31 are similarly connected through the top wall 312 of the tank 12.

Thus, the top wall 312, as shown in FIGS. 1 and 2, has a pair of enlarged ribs 312R formed thereon on opposite sides of the center line of the cover and in an aligned relation; and these ribs are extended beyond the wall 112 so that they may serve in providing for connection of the upper ends of the tubes or lines 30 and 31 to the cover 312. Thus, one of the ribs 312R has a horizontal passage 130 formed therein in a radial relation and at its inner end a downwardly extending passage 230 is formed that opens into the upper end of the tank 12. At its outer end, the bore 130 is enlarged and threaded to receive a valve member 330 that may be screwed inwardly so as to close the passage 130. A vertical bore 430 extends downwardly from the horizontal bore 130 in such a relationship that when the valve member 330 is screwed inwardly to a seated relation, the passage between the bores 130 and 330 is closed. The bore 430 extends upwardly through a nipple and a collar 530 which, with suitable packing is employed to connect the upper end of the tube 30 to the passage or bore 430.

The other of the ribs 312R has similarly related bores 131 and 231 with a similar valve 331, and a downwardly extended bore 431 is similarly connected by means of a fitting 531 to the upper end of the tube 31.

The lower end of the tube 30 is connected by means of a fitting 630 to a bore 730 that is formed radially into the passage 11P so as to open into the portion 11A of the passage 11P. Similarly, the lower end of the tube 31 is connected by a fitting 631 to a passage or bore 731 that opens radially into the portion 11B of the passage 11P.

The pipes 30 and 31 with the related fitting and bores provide the by-pass path for the water from the inlet portion 11A of the passage 11P to the upper portion of the tank 12 and then into the outlet portion 11B of the passage 11P, and while the effective area of this passage varies somewhat through its length, the portion that is connected with the outlet portion 11b is substantially restricted in area. Thus, the bore 730 has substantially twice the diameter of the bore 731. In the present instance, the feeder 10 is adapted for connection into the usual 1 inch water supply line that is used in residences and the like, and the passage 730 has a diameter of $3/16''$, while the passage 731 has a diameter of $3/32''$. The portions 11A and 11B of the passage 11P are substantially 1 inch in diameter while the restricted portion 11R has an effective area that is just slightly more than one-half the area of the portions 11A and 11B.

When the tank 12 is to be filled, the valves 330 and 331 are closed, and the pressure-release screw 17S is loosened to relieve the pressure in the tank 12 and this enables the cap 17 to be readily moved by means of wings 17W that project upwardly from the cover 17 for finger engagement. After the tank has been filled, the cap 17 is put in place and the relief screw 17S is tightened. Then, when the valves 330 and 331 are opened, the pressure applied within the tank acts on the O ring 18 to produce an effective pressure seal.

The feeder 10 that has thus been provided has been constructed particularly for feeding of soluble phosphates to attain a treating proportion within the range of from 2 to 3 parts per million, and it has been found in practice that the structure described attains this accuracy of feeding despite the variations of pressure and flow rate that are normally encountered. This, of course, is highly advantageous since it enables the feeder to be installed by plumbers, and does not require adjustment of any kind.

With the chemical feeder that is thus provided, the pressure differential in the passage 11P produces a by-pass flow of water which is quite accurately proportioned with respect to the flow in the main line despite the usual variations in flow rate and line pressure, and since this by-pass flow moves through the upper portion of the supply tank, and is thus subjected to the same conditions at all times, the proportioning action of the present feeder is relatively accurate. Moreover, the present feeder is so constructed and arranged that it does not require that the inlet thereof be at the bottom of the tank, and the by-pass water does not flow through the undissolved chemical supply. As a result the supply of undissolved chemical remains in a quiescent state, and the present feeder does not require the use of screens at either the top or bottom thereof.

Thus while I have illustrated and described the invention in a particular embodiment, it will be recognized that changes and variations may be made within the spirit and scope of the invention.

I claim:

1. In a chemical feeder, a chemical tank adapted to contain a soluble treating chemical in solid form, said tank having side, top and bottom walls and said top wall having a filling opening formed therein, a removable cover for said filling opening adapted to be secured in a tightly sealed and closing relationship to said opening, means providing a passage adapted for connection in a water line and having inlet and outlet ends and an intermediate restriction, inlet and outlet by-pass lines opening through said top wall and connected respectively to said passage adjacent to said inlet and outlet ends, said inlet by-pass line and said outlet by-pass line communicating with said inlet and outlet ends of the passage through radial ports of different sizes the smallest of which opens into said outlet passage, and cut-off valves for the by-pass lines housed in the top wall of the tank.

2. In a chemical feeder, a closed tank having top, bottom and side walls and adapted to contain a supply of soluble chemical which in the presence of water will produce a saturated solution in the tank, one of said walls having a main passage formed therein with inlet and outlet ends and an intermediate restriction and adapted to be connected into a water line, means providing fixed area inlet and outlet by-pass passages from points on opposite sides of the restriction to and into the upper portion of the tank, shut-off valves in said by-pass passages for closure during tank filling operations, and said cut-off valves for the by-pass passages being provided in the top wall of the tank with the material of such top wall forming a portion of the valve housings.

3. In a chemical feeder of the by-pass type, a base, a top wall and a transparent side wall clamped together to define a chemical tank, a passage formed through said base and having inlet and outlet ends for connection into a water line, a by-pass inlet tube extended from said passage adjacent said inlet end and opening into the tank through said top wall, a by-pass outlet tube opening out of said tank through said top wall and connected through a reduced bore to said passage adjacent said outlet end, and means in said passage defining a throat located between said by-pass connections.

References Cited in the file of this patent

UNITED STATES PATENTS

| | | |
|---|---|---|
| 461,235 | Butler | Oct. 13, 1891 |
| 878,280 | Dehn | Feb. 4, 1908 |
| 1,409,248 | Sevcik | Mar. 14, 1922 |
| 1,423,657 | Haines | July 25, 1922 |
| 1,834,172 | Osgood | Dec. 1, 1931 |
| 1,855,323 | Sirch | Apr. 26, 1932 |
| 2,532,973 | Wallenstein | Dec. 5, 1950 |
| 2,536,361 | Flanders | Feb. 2, 1951 |
| 2,609,232 | Taulman | Sept. 2, 1952 |
| 2,627,977 | Kent | Feb. 10, 1953 |
| 2,703,176 | Shuldener | Mar. 1, 1955 |
| 2,714,963 | Lester | Aug. 9, 1955 |